US011968027B2

United States Patent
Xu et al.

(10) Patent No.: US 11,968,027 B2
(45) Date of Patent: Apr. 23, 2024

(54) GEOGRAPHIC BOUNDARY SOLUTIONS FOR EARTH MOVING BEAMS

(71) Applicant: Apple Inc., Cupertino, CA (US)

(72) Inventors: Fangli Xu, Beijing (CN); Sarma V. Vangala, Campbell, CA (US); Chunxuan Ye, San Diego, CA (US); Haijing Hu, Los Gatos, CA (US); Krisztian Kiss, Hayward, CA (US); Murtaza A. Shikari, Mountain View, CA (US); Naveen Kumar R. Palle Venkata, San Diego, CA (US); Ralf Rossbach, Munich (DE); Sree Ram V. Kodali, San Jose, CA (US); Srinivasan Nimmala, San Jose, CA (US); Vijay Venkataraman, San Jose, CA (US); Yuqin Chen, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/440,865

(22) PCT Filed: Oct. 22, 2020

(86) PCT No.: PCT/CN2020/122995
§ 371 (c)(1),
(2) Date: Sep. 20, 2021

(87) PCT Pub. No.: WO2022/082668
PCT Pub. Date: Apr. 28, 2022

(65) Prior Publication Data
US 2023/0268984 A1 Aug. 24, 2023

(51) Int. Cl.
*H04B 7/10* (2017.01)
*H04B 7/185* (2006.01)
(Continued)

(52) U.S. Cl.
CPC .......... *H04B 7/1851* (2013.01); *H04W 48/16* (2013.01); *H04W 48/20* (2013.01)

(58) Field of Classification Search
CPC ................ H04B 7/1851; H04W 48/16; H04W 48/20; H04W 48/18; H04W 84/005; H04W 84/06
(Continued)

(56) References Cited

U.S. PATENT DOCUMENTS

| 5,506,886 A | 4/1996 | Maine et al. |
| 2017/0127332 A1 | 5/2017 | Axmon et al. |

(Continued)

FOREIGN PATENT DOCUMENTS

| CN | 107852227 A | 3/2018 |
| CN | 109218344 A | 1/2019 |
| WO | 2018052744 A3 | 4/2018 |

OTHER PUBLICATIONS

International Search Report dated Jul. 13, 2021 for International Application PCT/CN2020/122995.
(Continued)

*Primary Examiner* — Emmanuel Bayard
(74) *Attorney, Agent, or Firm* — Eschweiler & Potashnik, LLC

(57) ABSTRACT

Systems, methods, and devices are provided for performing cell selection or reselection in networks that include earth moving beams. In one example, a method includes receiving, via a satellite, control information transmitted by a base station indicating that a beam associated with a cell ID has been redirected; in response, measuring a beam strength of the redirected beam; and performing cell re-selection based on the measured beam strength.

13 Claims, 10 Drawing Sheets

(51) Int. Cl.
*H04W 48/16* (2009.01)
*H04W 48/20* (2009.01)

(58) Field of Classification Search
USPC .............................. 375/132, 262, 267, 347
See application file for complete search history.

(56) References Cited

U.S. PATENT DOCUMENTS

| | | | | |
|---|---|---|---|---|
| 2021/0144669 | A1* | 5/2021 | Edge | H04W 64/00 |
| 2022/0015012 | A1* | 1/2022 | Shrestha | H04W 36/32 |
| 2022/0110029 | A1* | 4/2022 | Shrestha | H04W 36/0072 |
| 2022/0150818 | A1* | 5/2022 | Liberg | H04B 7/18539 |
| 2022/0167221 | A1* | 5/2022 | Lee | H04W 36/08 |
| 2023/0116580 | A1* | 4/2023 | Cheng | H04W 72/21 |
| | | | | 370/329 |
| 2023/0189213 | A1* | 6/2023 | Kim | H04W 72/04 |
| | | | | 455/458 |

OTHER PUBLICATIONS

International Written Opinion dated Jul. 13, 2021 for International Application PCT/CN2020/122995.
3rd Generation Partnership Project; Technical Specification Group Radio Access Network, NR; User Equipment (UE) procedures in Idle mode and RRC Inactive state; (Release 16); 3GPP TS 38.304 V16.2.0; Sep. 2020.
3rd Generation Partnership Project; Technical Specification Group Radio Access Network; NR; Radio Resource Control (RRC) protocol specification; (Release 16); 3GPP TS 38.331 V16.2.0; Sep. 2020.
International Preliminary Report Patentability dated Apr. 13, 2023 for International Application PCT/CN2020/122995.

* cited by examiner

US 11,968,027 B2

GEOGRAPHIC BOUNDARY SOLUTIONS FOR EARTH MOVING BEAMS

REFERENCE TO RELATED APPLICATIONS

This application is a National Phase entry application of International Patent Application No. PCT/CN2020/122995 filed Oct. 22, 2020, entitled "GEOGRAPHIC BOUNDARY SOLUTIONS FOR EARTH MOVING BEAMS", the contents of which are herein incorporated by reference in their entirety.

BACKGROUND

Non-terrestrial networks include communication nodes that are located above the earth's surface. These nodes may be orbiting the earth or flying or hovering over some region of the earth.

BRIEF DESCRIPTION OF THE DRAWINGS

Some examples of circuits, apparatuses and/or methods will be described in the following by way of example only. In this context, reference will be made to the accompanying figures.

DETAILED DESCRIPTION

The present disclosure is described with reference to the attached figures. The figures are not drawn to scale and they are provided merely to illustrate the disclosure. Several aspects of the disclosure are described below with reference to example applications for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

As the number of mobile devices connected to wireless networks and the demand for mobile data traffic continue to increase, changes are made to system requirements and architectures to meet current and anticipated burgeoning demand. For example, wireless communication networks such as the 5G new radio (NR) systems may need to be deployed using satellites as parts of a non-terrestrial network (NTN). In one deployment scenario of a NTN, a satellite referred to as a transparent satellite may act as a relay station to link user devices with a ground-based base station and the 5G core network by implementing a transparent payload. In another deployment scenario, a satellite referred to as a regenerative satellite may have onboard processing capability to perform the functions of a base station by implementing a regenerative payload between the user devices and the ground-based 5G core network.

Multiple architectures and configurations for satellite networks have been discussed. These range from transparent to on-board architectures with a geostationary earth orbit (GEO), low earth orbit (LEO), medium earth orbit (MEO), or high altitude platform station (HAPS) based satellite configuration. The configuration can also vary based on single or multiple beams used by the satellite nodes or based on if the satellite has a single feeder link or multiple.

Figure 1A:
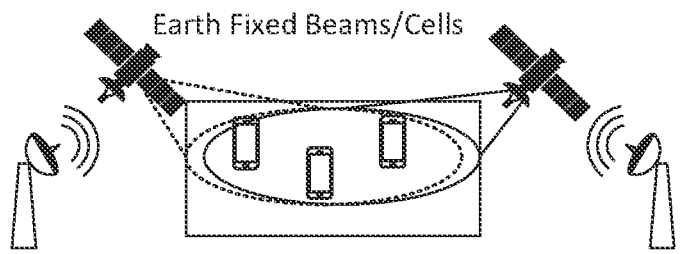
FIGS. 1A and 1B illustrate radio access networks that include satellites with earth fixed beams and earth moving beams, respectively.
Figure 1B:
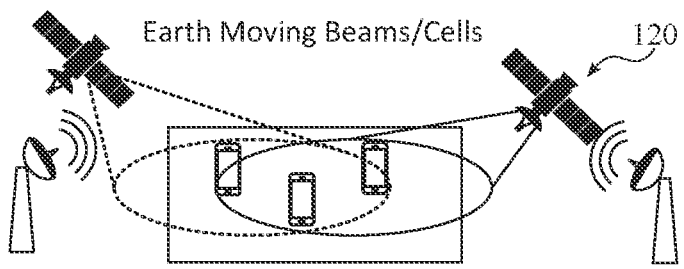

As illustrated in FIG. 1A, each of these beams can be steered through beam forming to fixed locations on earth (hereinafter "Earth Fixed Beams/Cells"). Alternatively, as illustrated in FIG. 1B, the beams may be continuously moving relative to earth latitude/longitudes (hereinafter "Earth Moving Beams/Cells"). The potential possibilities for each of these configuration choices coupled with the large cell size of NTN cells and constant changes between short but consistent coverage and potential outage durations makes cell selection and reselection based improvements important in Non-Terrestrial Networks. Complications are also added when terrestrial nodes are also present in areas where NTN coverage, whose signal qualities even though brief but are unvarying and strong, are also present.

Figure 2A:
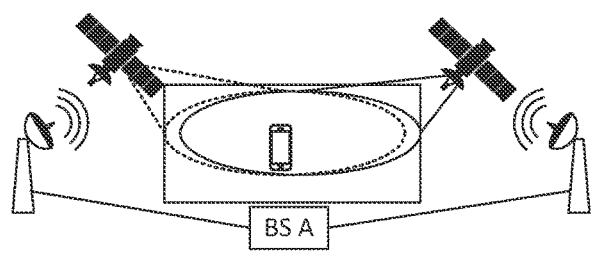
FIGS. 2A, 2B, 2C illustrate radio access networks that include satellites.
Figure 2B:
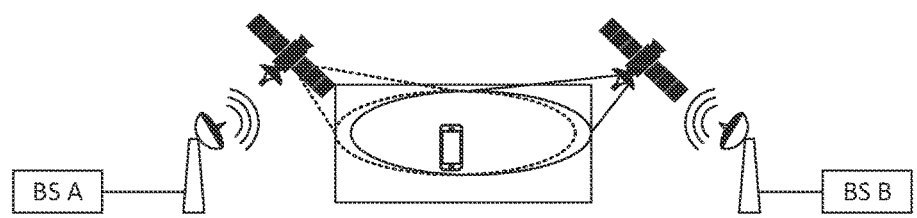
Figure 2C:
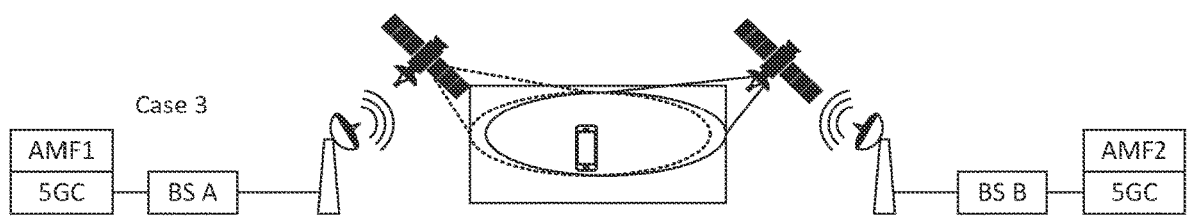

FIGS. 2A-2C illustrate different potential deployment possibilities in NTN. FIG. 2A illustrates an NTN in which satellites are used in a transparent mode architecture with a single base station uses the satellites as multiple gateways. FIG. 2B illustrates an NTN in which satellites are used in a transparent mode architecture with multiple independent base station using the satellites as multiple gateways. FIG. 2C illustrates an NTN in which satellites are used in a transparent mode architecture with different 5G core for each satellite. In addition to the transparent use of satellites illustrated in FIGS. 2A-2C, another deployment possibility is the regenerative satellite, which includes hardware implementing a base station on the satellite. It is to be understood that the techniques described herein are applicable to NTNs that include transparent and/or regenerative satellites or any other alternate deployment scenario.

In earth moving beam scenarios, when satellites are used as network nodes, the radio access network (RAN) includes nodes or base stations (e.g., next generation node B (gNB)) that have associated cells that move with respect to the surface of the earth. The fact that non-terrestrial cells are moving with respect to the earth combined with the significantly larger size of non-terrestrial cells means that a satellite physically located over a first country may now broadcast over PLMNs associated deep within the coverage of a neighboring country, which may cause significant interference and other radio coverage and security problems.

Figure 3:
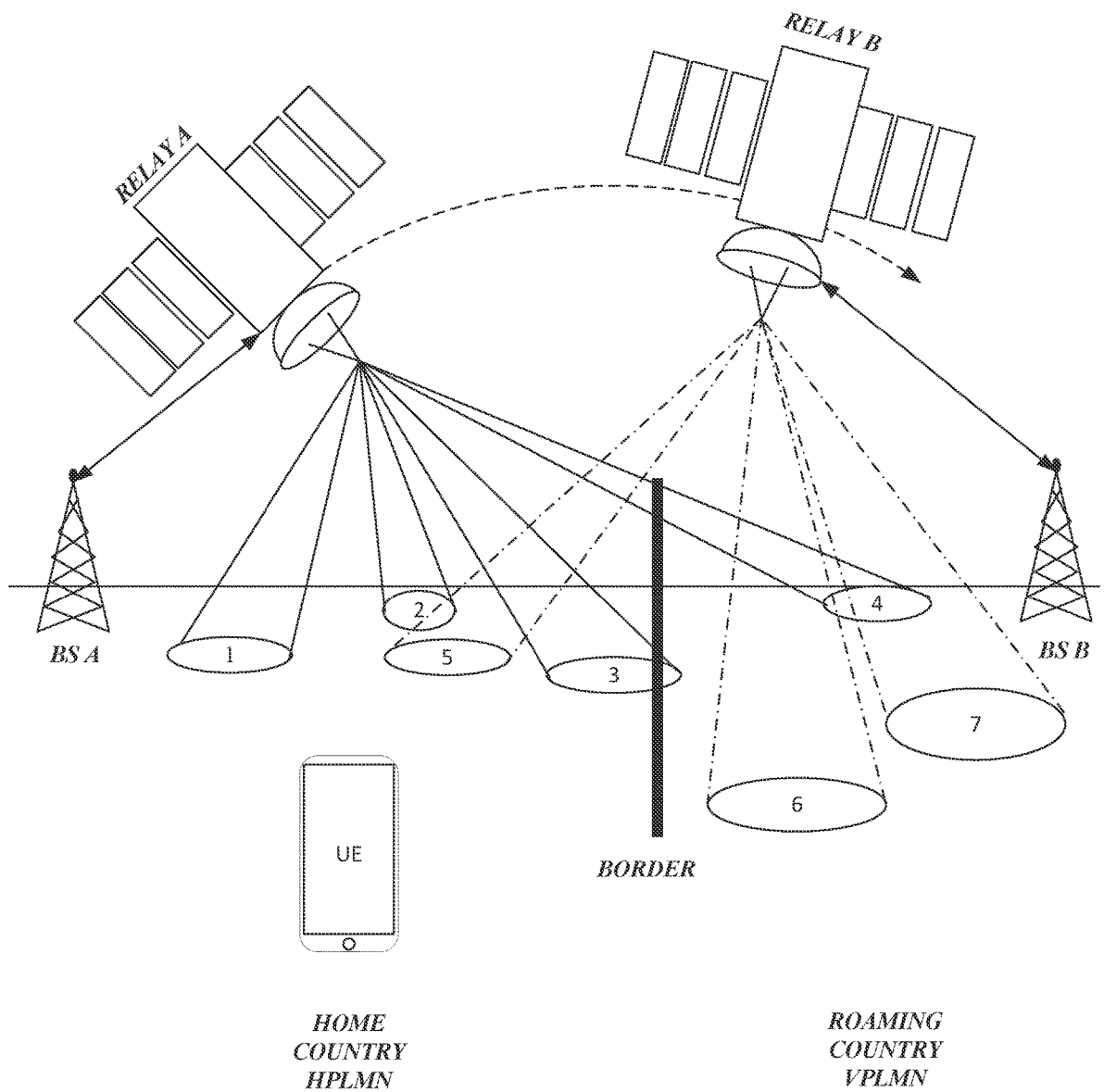
FIGS. 3 and 4 illustrate radio access networks that include satellites with earth moving beams having coverage near an international boundary

FIG. 3 illustrates an exemplary NTN that includes a UE device, two base stations, and two satellites acting as non-terrestrial relay nodes associated with BS A and BS B, respectively. While some of the following examples will be in the context of satellites used in a transparent manner a as RAN relay nodes, it is to be understood that the techniques described herein are also applicable to any network, including the use of satellites as relays, in which a cell's coverage is not in a fixed geographic position. Satellites, as used herein, may refer to satellites in geostationary orbit, medium earth orbit, or low earth orbit. Further, for the purposes of this description unless otherwise specified the term satellite is used broadly to also include high altitude platform stations (HAPS).

Satellite relay A transmits signals carrying data from BS A using multiple beams 1-4 (shown in solid line) while satellite relay B transmits signals carrying data from BS B using multiple beams 5-7 (shown in dashed line). As relay A and relay B move relative to the earth, as shown by orbit indicated in dashed line, the geographic area covered by each beam changes. A UE device is located in a home country near a border with a "roaming" country. While relay A is over the home country, BS A supports the UE device's home PLMN (HPLMN); however, while relay A is over the roaming country, the BS A will not support the UE device's HPLMN and will rather support the UE device's visiting PLMN (VPLMN). Likewise, with relay B as positioned in FIG. 1A, BS B supports the UE device's VPLMN but not the UE device's HPLMN.

Figure 4:
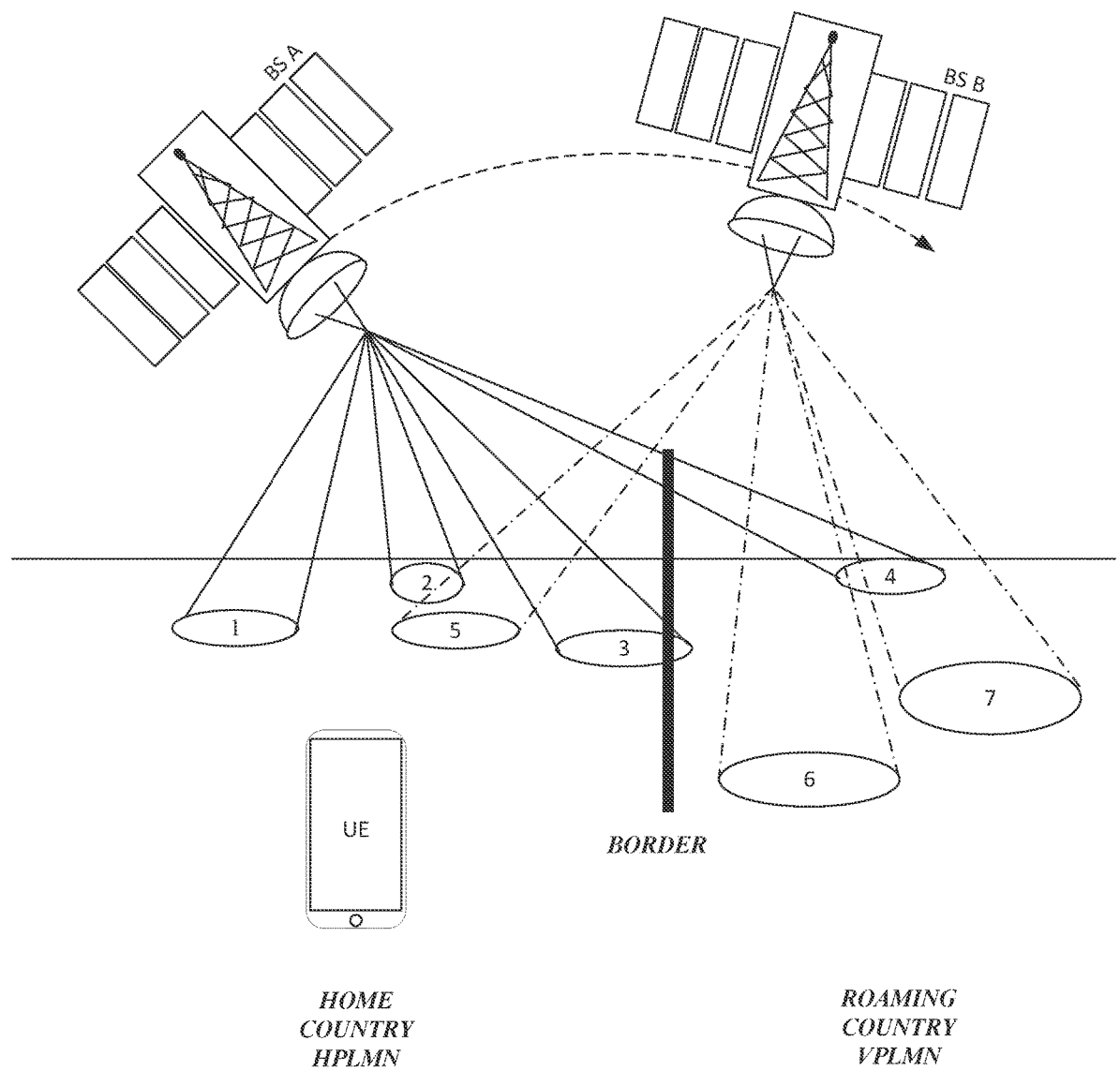

FIG. 4 illustrates an exemplary non-terrestrial network that includes a UE and two regenerative satellites acting as non-terrestrial (NT) RAN nodes labeled base BS A and BS B. While some of the following examples will be in the context of regenerative satellites as RAN nodes, it is to be understood that the techniques described herein are also applicable to any network, including the use of satellites as relays, in which a cell's coverage is not in a fixed geographic position. Satellites, as used herein, may refer to satellites in geostationary orbit, medium earth orbit, or low earth orbit. Further, for the purposes of this description unless otherwise specified the term satellite is used broadly to also include high altitude platform stations (HAPS).

BS A transmits signals using multiple beams 1-4 (shown in solid line) while BS B transmits signals using multiple beams 5-7 (shown in dashed line). As BS A and BS B move relative to the earth, as shown by orbit indicated in dashed line, the geographic area covered by each beam changes. A UE device is located in a home country near a border with a "roaming" country. While BS A is over the home country, BS A supports the UE device's home PLMN (HPLMN); however, while BS A is over the roaming country, the BS A will not support the UE device's HPLMN and will rather support the UE device's visiting PLMN (VPLMN). Likewise, as positioned in FIG. 1B, BS B supports the UE device's VPLMN but not the UE device's HPLMN.

To connect to a core network associated with the RAN, the UE performs a cell selection process in which the UE device measures the strength of signals carried by detectable beams. The UE device identifies a cell (which may be associated with a single beam of the BS) having the strongest signal based on measurements on beams that are detected by the UE. In some examples, the UE device may be preloaded with, or compile, a blacklist of cells that should not be considered for camping and/or a whitelist of cells that should be prioritized for camping.

The UE device decodes system information broadcast by the selected cell to determine which PLMNs are supported by the cell and to determine if the cell is barred from being accessed by the UE device. If the cell supports the UE device's home PLMN and the UE device is not barred from accessing the cell, the UE device camps on the cell until some cell reselection criteria is met. If the UE device is unable to find an acceptable cell that supports the UE device's HPLMN, the UE device may then determine if an acceptable cell that supports a VPLMN for the UE device and, if so, the UE device may camp on the VPLMN until a cell that supports the HPLMN can be found. When the cell reselection criteria are met, the UE device performs a similar process to identify a new acceptable cell for camping.

In the situation illustrated in FIG. 3 or 4, when the UE device performs cell selection or reselection it may detect beams from both BS A and BS B. The UE device should select a beam from BS A rather than BS B, even if a beam from BS B (e.g., beam 5) provides a stronger signal. Several alternative approaches are presented for facilitating an efficient cell selection process in which a UE device that may connect to cells originating in different countries selects a cell within the UE device's HPLMN. While examples below are in the context of moving cells that may cross international borders, it is to be understood that the solutions present are equally applicable to moving beams that may cross other arbitrary geographic boundaries between networks.

Ephemeris data contains the orbital trajectories of satellite networks. They provide information in terms of earth relative location coordinates of the satellite position based on time of day along with other useful information. The information in this database allows for deterministic knowledge of when the satellite will be in viewing range of a UE device and when it will not be available. Propagating this information to the UE device may be beneficial to the UE in terms of cell selection procedures.

Ephemeris data and UE location information may be used for cell selection and reselection. Using its location and ephemeris data, the UE device can calculate with certain degree of accuracy additional parameters such as satellite configuration (LEO, GEO etc.), the distance to satellite or elevation angle or some additional parameters that can aid in cell selection criteria. Considering the potential inaccuracies in determining these parameters and potential problems in transmitting the entire database to the UE device in either a pre-loaded form (through uSIM) or through SIB (due to the overhead) based broadcasts, it would be beneficial if the network includes these additional parameters of satellite mobility and coverage information in some format to the UE device in initial cell selection broadcast information. Additionally, UE device location information calculations can lead to power constraints on the UE while generating privacy constraints if provided to the network. Even though location information cannot be excluded, it would be extremely useful for the network to provide ephemeris data and a relevant offset to the UE device.

In the cases of mixed coverage areas, one issue that will be seen by UE devices is that the large coverage areas of NTN will lead to tens and even hundreds of potential terrestrial neighbor cells. On approach to addressing this issue to use UE location information to identify the zone the UE device is present in and use reselection based on the location identification. This however is power consuming since the UE device will be tasked with continuously monitoring its location in order to identify if it is in or out of a particular fixed or mobile beam.

While location information is power expensive for regular cases of cell selections and reselections, it is very useful at international boundaries. With existing terrestrial networks deployments cellular radio waves can be controlled in a way where they do not penetrate deep into the roaming country. However, in satellite networks with large cell sizes such restrictions cannot be applied easily. In such situations, geolocation-based advertisements of home and roaming cells would be very useful and such information should be broadcasted to the UE devices so as to ensure that satellites can limit the coverage and form boundaries between home and roaming country networks. Satellite ephemeris data can aid the network in ensuring that the broadcast of additional information to the UE device can be done when the satellite approaches the location boundaries or when the beams start to cross the international boundaries as the case may be.

Disclosed herein are systems, circuitries, and techniques for supporting efficient UE device cell selection and re-selection in networks that include moving RAN nodes in a manner that recognizes international boundaries.

Figure 5:
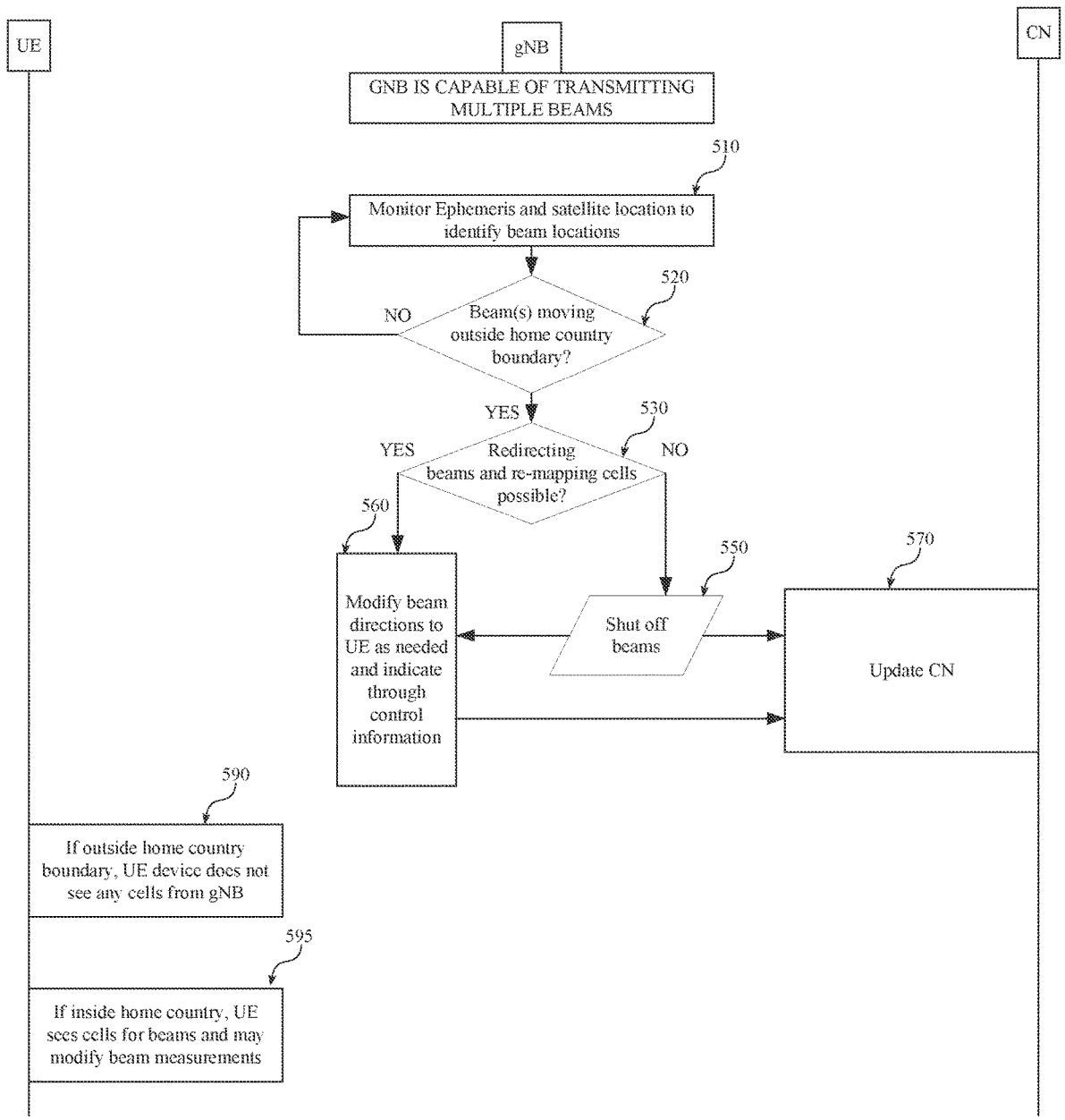
FIG. 5 is a flow diagram outlining an exemplary cell selection process with moving beams, in accordance with various aspects described.

FIG. 5 illustrates a functional flow diagram of an exemplary cell selection or re-selection (hereinafter simply "selection") process for communication with a moving cell associated with a satellite. In this process it is presumed that the gNB of the satellite is capable of transmitting multiple beams and as such may be supporting multiple cells, each associated with one or more beams. At 510, the gNB monitors the Ephemeris database (e.g., a publicly available database that provides coordinates of satellites) and/or the satellite's position. At 520 the gNB determines whether any beams are moving outside a home country boundary. When it is determined that a beam is moving outside the boundary, at 530 it is determined whether the beam can be redirected to remain inside the boundary and the cell's physical cell ID re-mapped to a new geographic region. At 570 the gNB informs the core network (CN) that the beam has been mapped to a new physical cell so to assist the CN in locating the UE device for paging purposes. In one example, control information (e.g., Layer 1 (L1) downlink control information (DCI)) for the beam is modified to reflect the redirection.

If it is not possible to redirect the beam, at 550 the beam is shut off. In some examples, a wait timer is employed (see FIG. 6) prior to shutting of the beam. At 570 the gNB informs the core network (CN) that the beam has been shut off. The updating of the CN may including updating the CN that the beam has been redirected/shutoff to mark registration status at the CN's access and mobility management function (AMF) for the beam ID/cell ID that is being deactivated.

As indicated at 590, if the UE device is outside the home country, the UE device will not detect any cells from the moving cell because any beams that cover a region outside the home country are turned off. As indicated at 595, when the UE device is inside the home country, the UE device will detect cells associated with beams from the satellite. The UE device may be triggered by the control information generated and transmitted at 540 to measure the strength of the redirected beam and determine whether to perform cell reselection based on the new beam measurements.

It can be seen that in the solution of FIG. 5 the gNB is responsible for tracking the coverage of its moving cell(s) associated with different beams and turning beams off when the beam reaches outside the country boundary. This expedites the cell selection process because the UE device will not detect signals from cells that include coverage outside the UE device's HPLMN.

Figure 6:
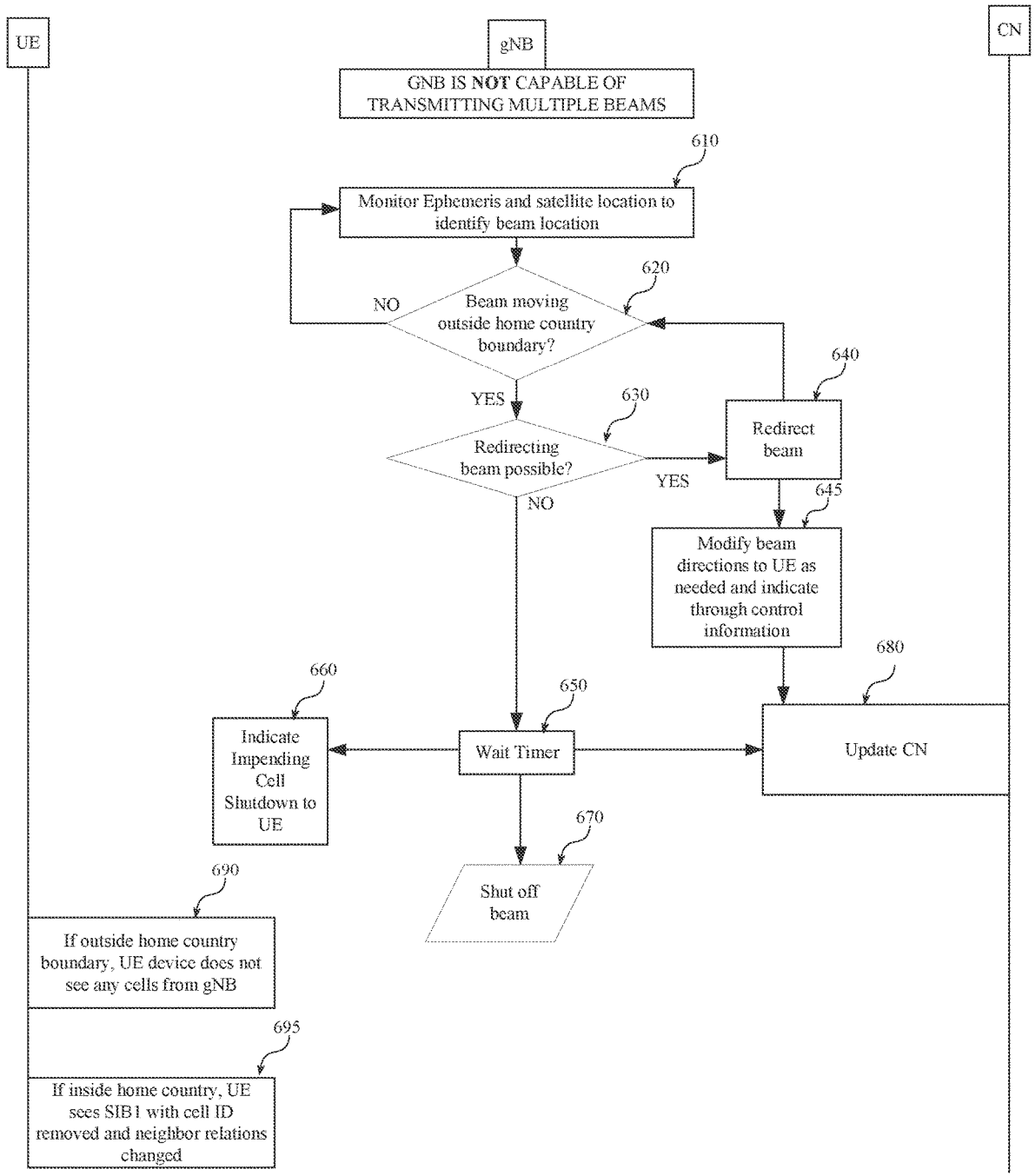
FIG. 6 is a flow diagram outlining an exemplary cell selection process with moving beams, in accordance with various aspects described.

FIG. 6 illustrates a functional flow diagram of an exemplary cell selection process for communication with a moving cell associated with a satellite. In this process it is presumed that the gNB of the satellite is not capable of transmitting multiple beams and as such is associated with a single cell. At 610, the gNB monitors the Ephemeris database (e.g., a publicly available database that provides coordinates of satellites) and/or the satellite's position. At 620 the gNB determines whether the beam is moving outside a home country boundary. When it is determined that a beam is moving outside the boundary, at 630 it is determined whether the beam can be redirected to remain inside the boundary. If so, at 640 the beam is redirected and the cell's physical cell ID is re-mapped to a new geographic region. At 645 control information transmitted to the UE device (e.g., L1 DCI) for the beam is modified to reflect the redirection for the UE device. At 680 the gNB informs the core network (CN) that the beam has been mapped to a new physical cell so to assist the CN in locating the UE device for paging purposes.

If it is not possible to redirect the beam, at 650 a wait timer is initiated and during the associated wait time, the impending cell shutdown is signaled at 660 (e.g., by way of system information (e.g., system information block (SIB) 1). In one example, the impending cell shutdown is signaled by transmitting SIB1 that indicates that the cell ID is barred. At 680 the gNB informs the core network (CN) that the cell is deactivated. The updating of the CN may including updating the CN that the beam has been redirected/shutoff to mark registration status at the CN's access and mobility management function (AMF) for the cell ID that is being deactivated. After the wait time expires, at 670 the beam is shut off.

As indicated at 690, if the UE device is outside the home country, the UE device will not detect any cells from the moving cell because when the cell's beam covers a region outside the home country the beam (and thus also the cell) is turned off. As indicated at 695, when the UE device is inside the home country but the satellite associated with the gNB is providing cell coverage outside the home country, the UE device receives system information (e.g., SIB1) that no longer includes a signal from the cell because the beam for the cell has been turned off. Further, the neighbor relations communicated in SIB are changed to indicate that previous neighbor relations relative to the cell that has been shut off are no longer valid and an updated cell list is provided.

It can be seen that in the solution of FIG. 6 the gNB is responsible for tracking the coverage of its moving cell associated with single beam and turning the beam off and thereby deactivating the cell when the cell's coverage reaches outside the country boundary. This expedites the cell selection process because the UE device will not detect signals from cells that include coverage outside the UE device's HPLMN.

Figure 7:
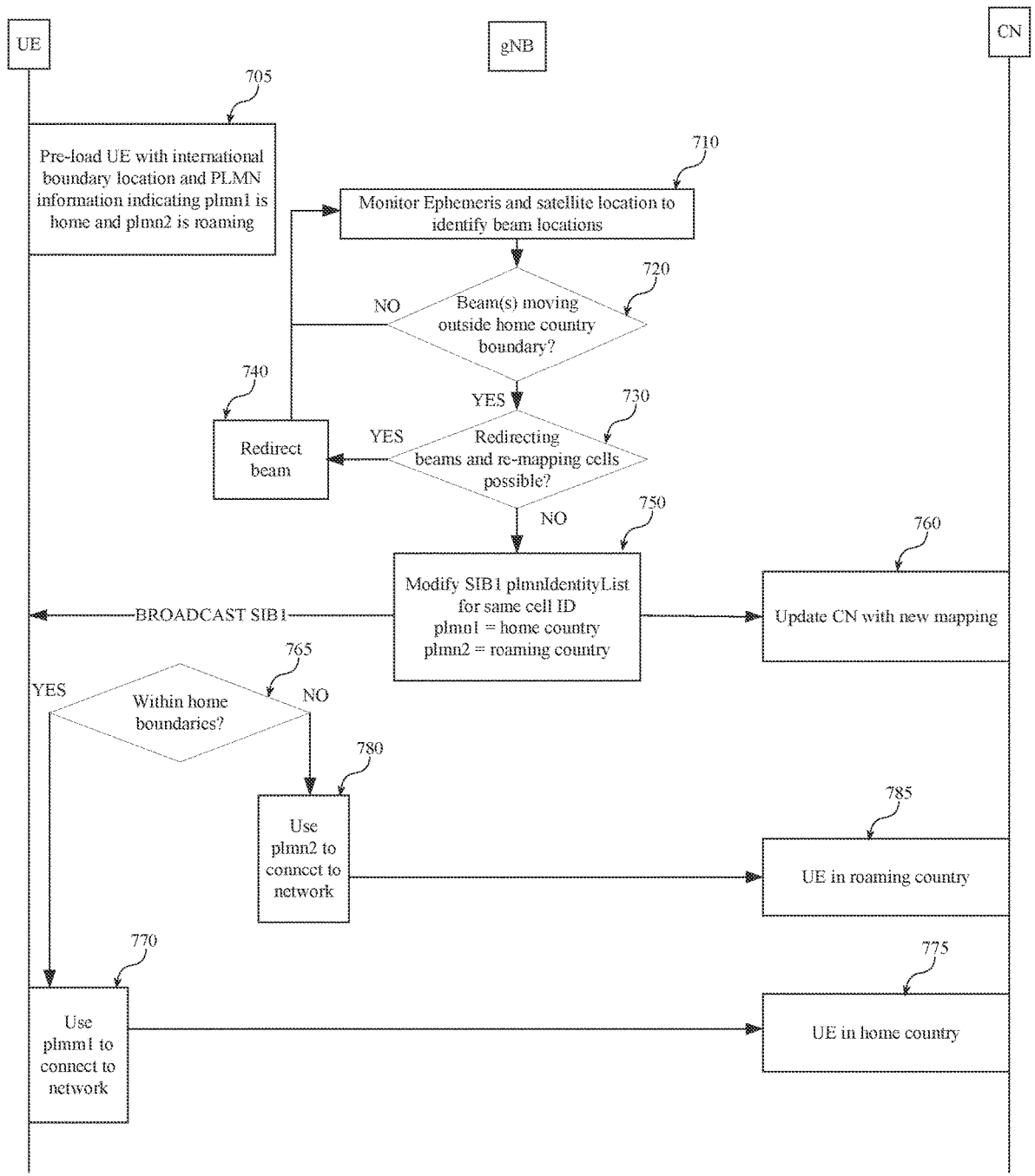
FIG. 7 is a flow diagram outlining an exemplary cell selection process with moving beams, in accordance with various aspects described.

FIG. 7 illustrates a functional flow diagram of another exemplary cell selection process for communication with a moving cell associated with a satellite. At 705, the UE device is pre-loaded with the location of the international boundary and PLMN information that informs the UE device that plmn1 is the home PLMN and that plmn2 is the roaming country PLMN.

At 710, the gNB monitors the Ephemeris database (e.g., a publicly available database that provides coordinates of satellites) and/or the satellite's position. At 720 the gNB determines whether any of its beams (or single beam) are moving outside a home country boundary. When it is determined that a beam is moving outside the boundary, at 730 it is determined whether the beam can be redirected to remain inside the boundary and re-mapped and if so, at 740 the beam is redirected.

If it is not possible to redirect the beam, at 750 the gNB modifies the system information broadcast by the cell ID associated with the beam to indicate that the cell ID is no longer in the PLMN for the home country and is now in the PLMN for the roaming country. In one example, the gNB modifies the plmnIdentitylist information element in SIB1 to no longer list the cell ID in the home country PLMN "plmn1." The gNB modifies the plmnIdentitylist information element to now list the cell ID in the roaming country PLMN "plmn2." At 780 the gNB informs the core network (CN) that the cell ID is remapped to plmn2.

At 765, the UE device compares its position to the pre-loaded international boundary location and determines whether it is within the home country boundary. If so, at 770, based on the pre-loaded PLMN information, the UE device uses plmn1 to connect to the network and at 775 notifies the CN that the UE device is in the home country. This means that the UE device will select a cell ID that supports plmn1, based on broadcast system information. If the UE device determines that it is outside the home boundaries, at 780, based on the pre-loaded PLMN information, the UE device uses plmn2 to connect to the network and at 785 notifies the CN that the UE device is in the roaming country. This means that the UE device will select a cell ID that supports plmn2, based on broadcast system information.

It can be seen that in the solution of FIG. 7 the gNB is responsible for remapping cell IDs to PLMNs based on the changing coverage of its moving cell(s) and to broadcast system information that reflects the up to date mapping. The UE device is responsible for determining whether it is in the home country or the roaming country and selecting the PLMN associated with its current location. This expedites the cell selection process because the UE device will not select cells that are not associated with the appropriate PLMN.

Figure 8:
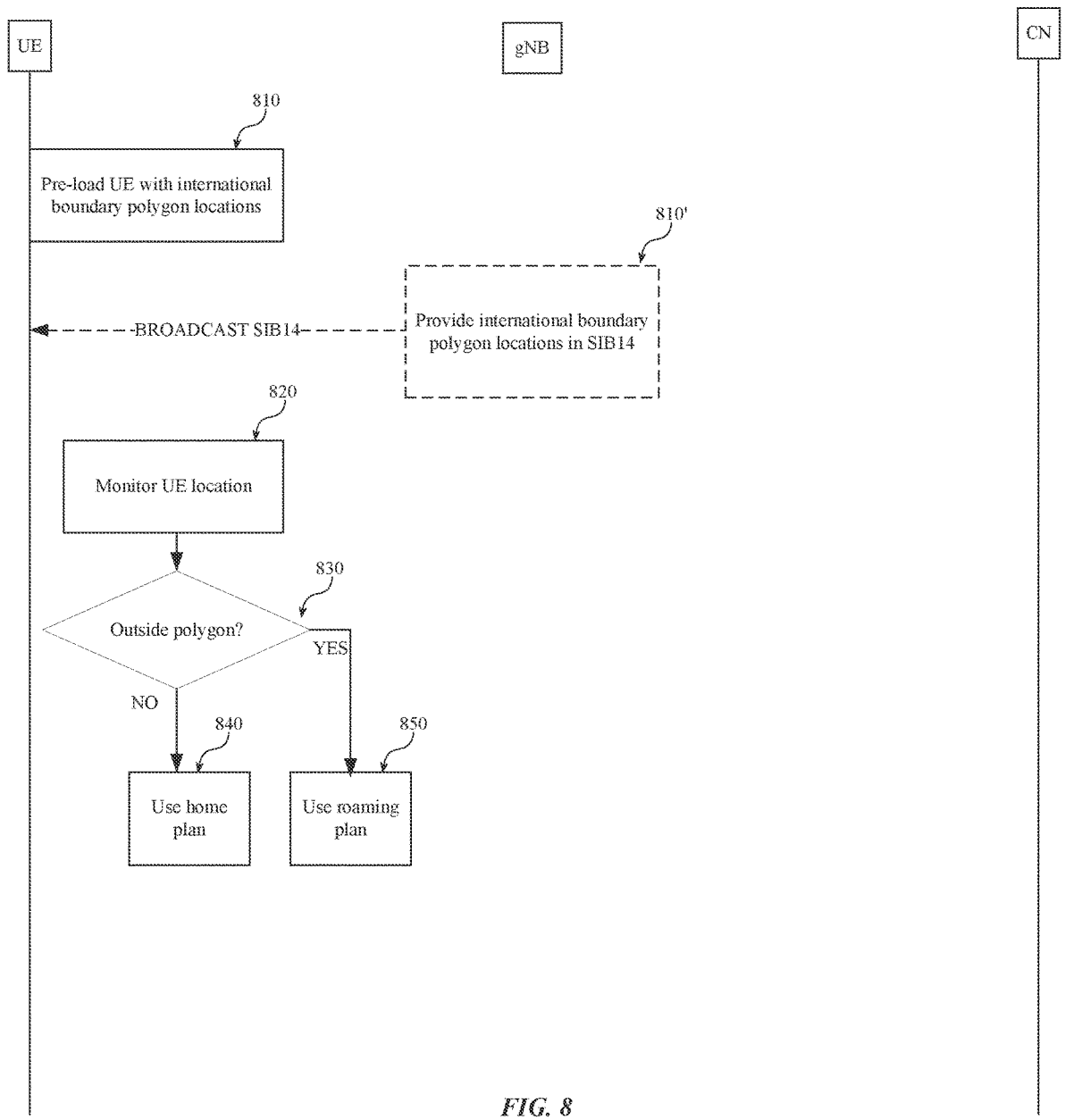
FIG. 8 is a flow diagram outlining an exemplary cell selection process with moving beams, in accordance with various aspects described.

FIG. 8 illustrates a functional flow diagram of another exemplary cell selection process for communication with a moving cell associated with a satellite. At 810, storage media of the UE device is pre-loaded with a geographic region describing a home country (e.g., the international boundary polygon locations for the home country, latitude and longitude coordinates, and so on). Alternatively, at 810', the geographic region information for surrounding countries may be broadcast as system information by the gNB (e.g., in SIB14 which is used currently for emergency broadcasts).

At 820, the UE device monitors its location and at 830 compares its position to the geographic region information for the home country and determines whether it is within the home country boundary. If so, at 840, the UE device uses the home PLMN to connect to the CN. This means that the UE device will select a cell ID that supports its HPLMN. If not, at 850, the UE device uses the roaming PLMN to connect to the CN. This means that the UE device may select a cell ID that supports a VPLMN.

It can be seen that the solution of FIG. 8 the UE device is solely responsible for determining whether it is in the home country or the roaming country and connect accordingly. This approach limits the amount of overhead signaling from the gNB but may require significant processing resources at the UE device.

Included herein are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

As used herein, the term derive when used with reference to some entity or value of an entity is to be construed broadly. "Derive" should be construed to encompass accessing and reading memory (e.g., lookup table, register, device memory, remote memory, and so on) that stores some initial value or foundational values and performing processing and/or logical/mathematical operations on the value or values to generate the derived entity or value for the entity. "Derive" should be construed to encompass computing or calculating the entity or value of the entity based on other quantities or entities. "Derive" should be construed to encompass any manner of deducing or identifying an entity or value of the entity.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Figure 9:
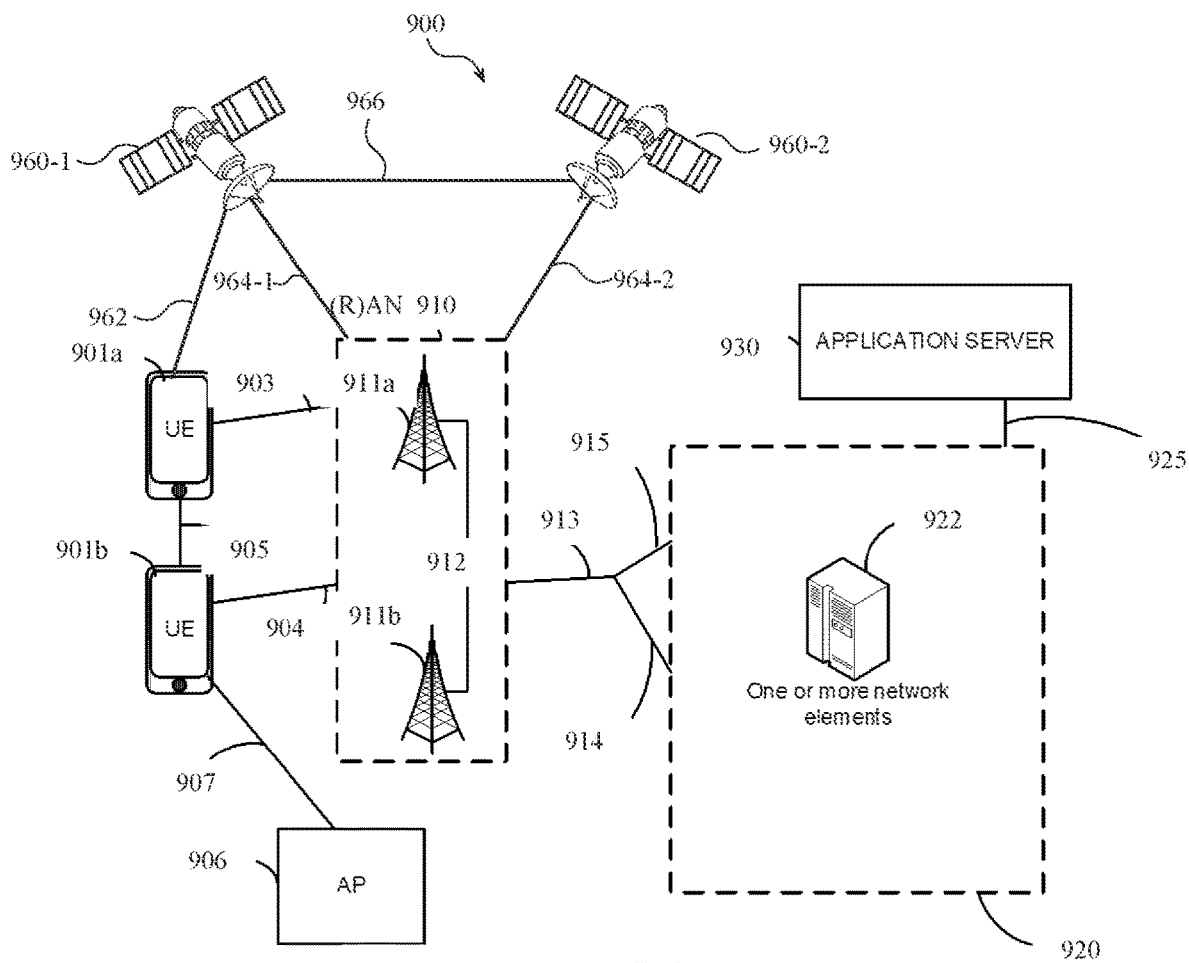
FIG. 9 illustrates an example communication network, in accordance with various aspects disclosed.

FIG. 9 illustrates an example architecture of a system 900 of a communication network, in accordance with various aspects. The following description is provided for an example system 900 that operates in conjunction with the LTE system standards and 5G or NR system standards as provided by 3GPP technical specifications. However, the example aspects are not limited in this regard and the described aspects may apply to other networks that benefit from the principles described herein, such as future 3GPP systems (e.g., Sixth Generation (6G)) systems, IEEE 702.16 protocols (e.g., WMAN, WiMAX, etc.), or the like.

As shown by FIG. 9, the system 900 includes UE 901a and UE 901b (collectively referred to as "UEs 901" or "UE 901"). In this example, UEs 901 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some aspects, any of the UEs 901 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 901 may be configured to connect, for example, communicatively couple, with a RAN 910. In aspects, the RAN 910 may be an NG RAN or a 5G RAN, an E-UTRAN, or a legacy RAN, such as a UTRAN or GERAN. As used herein, the term "NG RAN" or the like may refer to a RAN 910 that operates in an NR or 5G system 900, and the term "E-UTRAN" or the like may refer to a RAN 910 that operates in an LTE or 4G system 900. The UEs 901 utilize connections (or channels) 903 and 904, respectively, each of which comprises a physical communications interface or layer (discussed in further detail below).

In this example, the connections 903 and 904 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In aspects, the UEs 901 may directly exchange communication data via a ProSe interface 905. The ProSe interface 905 may alternatively be referred to as a SL interface 905 and may comprise one or more logical channels, including but not limited to a PSCCH, a PSSCH, a PSDCH, and a PSBCH.

The UE 901b is shown to be configured to access an AP 906 (also referred to as "WLAN node 906," "WLAN 906," "WLAN Termination 906," "WT 906" or the like) via connection 907. The connection 907 can comprise a local wireless connection, such as a connection consistent with any IEEE 702.11 protocol, wherein the AP 906 would comprise a wireless fidelity (Wi-Fi®) router. In this example, the AP 906 is shown to be connected to the Internet without connecting to the core network of the wireless system (described in further detail below). In various aspects, the UE 901b, RAN 910, and AP 906 may be configured to utilize LWA operation and/or LWIP operation. The LWA operation may involve the UE 901b in RRC_CONNECTED being configured by a RAN node 911a-b to utilize radio resources of LTE and WLAN. LWIP operation may involve the UE 901b using WLAN radio resources (e.g., connection 907) via IPsec protocol tunneling to authenticate and encrypt packets (e.g., IP packets) sent over the connection 907. IPsec tunneling may include encapsulating the entirety of original IP packets and adding a new packet header, thereby protecting the original header of the IP packets.

The RAN 910 can include one or more AN nodes or RAN nodes 911a and 911b (collectively referred to as "RAN nodes 911" or "RAN node 911") that enable the connections 903 and 904. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As described below, in some implementations, satellites 960 may operate as bases stations (e.g., RAN nodes 911) with respect to UEs 901. As such, references herein to a base station, RAN node 911, etc., may involve implementations where the base station, RAN node 911, etc., is a terrestrial network node and also to implementation where the base station, RAN node 911, etc., is a non-terrestrial network node (e.g., satellite 160).

As used herein, the term "NG RAN node" or the like may refer to a RAN node 911 that operates in an NR or 5G system 900 (for example, a gNB), and the term "E-UTRAN node" or the like may refer to a RAN node 911 that operates in an LTE or 4G system 900 (e.g., an eNB). According to various aspects, the RAN nodes 911 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

According to various aspects, the UEs 901 and the RAN nodes 911 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 901 and the RAN nodes 911 may operate using LAA, eLAA, and/or feLAA mechanisms. In these implementations, the UEs 901 and the RAN nodes 911 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UEs 901 RAN nodes 911, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 702.11 technologies. WLAN employs a contention-based channel access mechanism, called CSMA/CA. Here, when a WLAN node (e.g., a mobile station (MS) such as UE 901, AP 906, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 8 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 901 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 901. The PDCCH carries information about the transport format and resource allocations related to the PDSCH channel, among other things. It may also inform the UEs 901 about the transport format, resource allocation, and HARQ information related to the uplink shared channel. Typically, downlink scheduling (assigning control and shared channel resource blocks to the UE 901b within a cell) may be performed at any of the RAN nodes 911 based on channel quality information fed back from any of the UEs 901. The downlink resource assignment information may be sent on the PDCCH used for (e.g., assigned to) each of the UEs 901.

The RAN 910 is shown to be communicatively coupled to a core network—in this aspect, core network (CN) 920. The CN 920 may comprise a plurality of network elements 922, which are configured to offer various data and telecommunications services to customers/subscribers (e.g., users of UEs 901) who are connected to the CN 920 via the RAN 910. The components of the CN 920 may be implemented in one physical node or separate physical nodes including components to read and execute instructions from a machine-readable or computer-readable medium (e.g., a non-transitory machine-readable storage medium). In some aspects, NFV may be utilized to virtualize any or all of the above-described network node functions via executable instructions stored in one or more computer-readable storage mediums (described in further detail below). A logical instantiation of the CN 920 may be referred to as a network slice, and a logical instantiation of a portion of the CN 920 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

As shown, example network 900 may include an NTN that may comprise one or more satellites 960-1 and 960-2 (collectively, "satellites 960"). Satellites 960 may be in communication with UEs 901 via service link or wireless interface 962 and/or RAN 910 via feeder links or wireless interfaces 964 (depicted individually as 964-1 and 964). In some implementations, satellite 960 may operate as a passive or transparent network relay node regarding communications between UEs 901 and the terrestrial network (e.g., RAN 910). In some implementations, satellite 960 may operate as an active or regenerative network node such that satellite 960 may operate as a base station to UEs 901 (e.g., as a gNB of RAN 910) regarding communications between UE 901 and RAN 910. In some implementations, satellites 960 may communicate with one another via a direct wireless interface (e.g., 966) or an indirect wireless interface (e.g., via RAN 910 using interfaces 964-1 and 964-2). Additionally, or alternatively, satellite 960 may include a GEO satellite, LEO satellite, or another type of satellite. Satellite 960 may also, or alternatively pertain to one or more satellite systems or architectures, such as a global navigation satellite system (GNSS), global positioning system (GPS), global navigation satellite system (GLONASS), BeiDou navigation satellite system (BDS), etc. In some implementations, satellites 960 may operate as bases stations (e.g., RAN nodes 911) with respect to UEs 901. As such, references herein to a base station, RAN node 911, etc., may involve implementations where the base station, RAN node 911, etc., is a terrestrial network node and implementation, where the base station, RAN node 911, etc., is a non-terrestrial network node (e.g., satellite 960).

Figure 10:
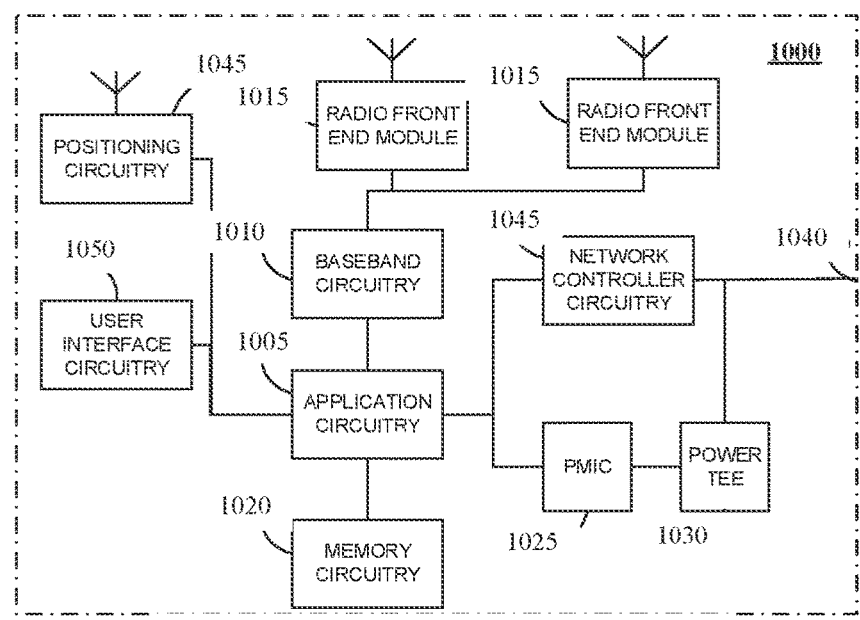
FIG. 10 illustrates an example of an infrastructure equipment device (e.g., BS, eNB, gNB), in accordance with various aspects disclosed.

FIG. 10 illustrates an example of infrastructure equipment 1000 in accordance with various aspects. The infrastructure equipment 1000 (or "system 1000") may be implemented as a base station, radio head, RAN node such as the RAN nodes 911 and/or AP 906 shown and described previously, application server(s) 930, and/or any other element/device discussed herein. In other examples, the system 1000 could be implemented in or by a UE.

The system 1000 includes application circuitry 1005, baseband circuitry 1010, one or more radio front end modules (RFEMs) 1015, memory circuitry 1020, power management integrated circuitry (PMIC) 1025, power tee circuitry 1030, network controller circuitry 1035, network interface connector 1040, satellite positioning circuitry 1045, and user interface 1050. In some aspects, the device 1000 may include additional elements such as, for example, memory/storage, display, camera, sensor, or input/output (I/O) interface. In other aspects, the components described below may be included in more than one device. For example, said circuitries may be separately included in more than one device for CRAN, vBBU, or other like implementations.

Application circuitry 1005 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1005 may be coupled with or may include memory/storage elements and may be configured to execute instructions stored in the memory/storage to enable various applications or operating systems to run on the system 1000. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1005 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some aspects, the application circuitry 1005 may comprise, or may be, a special-purpose processor/controller to operate according to the various aspects herein. As examples, the processor(s) of application circuitry 1005 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium(™), Inc.; a MIPS-based design from MIPS Technologies, Inc. such as MIPS Warrior P-class processors; and/or the like. In some aspects, the system 1000 may not utilize application circuitry 1005, and instead may include a special-purpose processor/controller to process IP data received from an EPC or 5GC, for example.

User interface circuitry 1050 may include one or more user interfaces designed to enable user interaction with the system 1000 or peripheral component interfaces designed to enable peripheral component interaction with the system 1000. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 10 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

Figure 11:
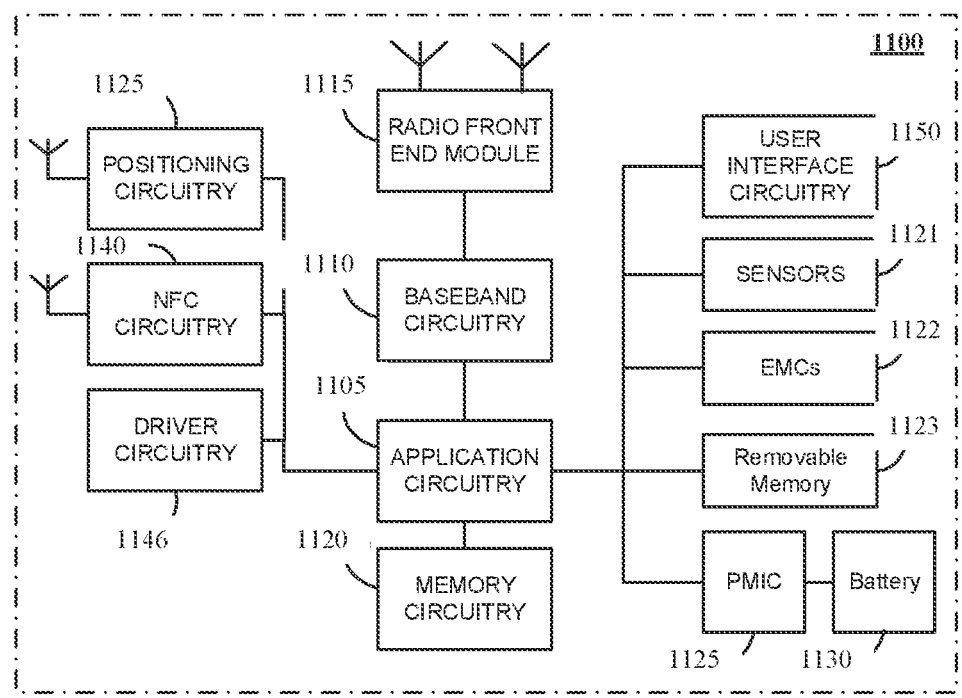
FIG. 11 illustrates an example of a user equipment device (referred to herein interchangeably as a "UE" or "UE device"), in accordance with various aspects disclosed.

FIG. 11 illustrates an example of a platform 1100 (or "device 1100") in accordance with various aspects. In aspects, the computer platform 1100 may be suitable for use as UEs 901, application servers 930, and/or any other element/device discussed herein. The platform 1100 may include any combinations of the components shown in the example. The components of platform 1100 may be implemented as integrated circuits (ICs), portions thereof, discrete electronic devices, or other modules, logic, hardware, software, firmware, or a combination thereof adapted in the computer platform 1100, or as components otherwise incorporated within a chassis of a larger system. The block diagram of FIG. 11 is intended to show a high level view of components of the computer platform 1100. However, some of the components shown may be omitted, additional components may be present, and different arrangement of the components shown may occur in other implementations.

Application circuitry 1105 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 1105 may be coupled with or may include memory/storage elements and may be configured to execute instructions stored in the memory/storage to enable various applications or operating systems to run on the system 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 1105 may include a general or special purpose processor, such as an A-series processor (e.g., the A13 Bionic), available from Apple® Inc., Cupertino, California or any other such processor. The processors of the application circuitry 1105 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-ft and Cortex-M family of processors; or the like. In some implementations, the application circuitry 1105 may be a part of a system on a chip (SoC) in which the application circuitry 1105 and other components are formed into a single integrated circuit, or a single package.

The baseband circuitry 1110 may be implemented, for example, as a solder-down substrate including one or more integrated circuits, a single packaged integrated circuit soldered to a main circuit board or a multi-chip module containing two or more integrated circuits.

The platform 1100 may also include interface circuitry (not shown) that is used to connect external devices with the platform 1100. The external devices connected to the platform 1100 via the interface circuitry include sensor circuitry 1121 and electro-mechanical components (EMCs) 1122, as well as removable memory devices coupled to removable memory circuitry 1123.

A battery 1130 may power the platform 1100, although in some examples the platform 1100 may be mounted deployed in a fixed location, and may have a power supply coupled to an electrical grid. The battery 1130 may be a lithium ion battery, a metal-air battery, such as a zinc-air battery, an aluminum-air battery, a lithium-air battery, and the like. In some implementations, such as in V2X applications, the battery 1130 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

EXAMPLES

Example 1 is a user equipment device, including a processor configured to perform operations including receiving, via a satellite, control information transmitted by a base station indicating that a beam associated with a cell ID has been redirected; in response, measuring a beam strength of the redirected beam; and performing cell re-selection based on the measured beam strength.

Example 2 includes the subject matter of example 1, including or omitting optional elements, wherein the control information includes Layer 1 downlink control information.

Example 3 is a method, including receiving, via a satellite, control information transmitted by a base station indicating that a beam associated with a cell ID has been redirected; in response, measuring a beam strength of the redirected beam; and performing cell re-selection based on the measured beam strength.

Example 4 includes the subject matter of example 3, including or omitting optional elements, wherein the control information includes Layer 1 downlink control information.

Example 5 is a base station, including a processor configured to perform operations including identifying a first geographic region covered by a beam transmitted by a satellite, wherein the beam carries data transmitted by the base station; and, when the first geographic region is proximate a boundary of a designated home region, redirecting the beam so that the beam covers a second geographic region within the designated home region; and transmitting, via the satellite, control information to a user equipment device that indicates that the beam is redirected.

Example 6 includes the subject matter of example 5, including or omitting optional elements, wherein the control information includes Layer 1 downlink control information.

Example 7 includes the subject matter of example 5, including or omitting optional elements, wherein processor is configured to perform operations including determining that the beam cannot be redirected to cover a geographic region within the designated home region; and, in response, shutting off the beam; transmitting, via the satellite, control information indicating that the beam has been shut off to the user equipment device; and transmitting an indication that the beam is shut off to a core network.

Example 8 includes the subject matter of example 7, including or omitting optional elements, wherein the control information includes Layer 1 downlink control information.

Example 9 is a method, including identifying a first geographic region covered by a beam transmitted by a satellite, wherein the beam carries data transmitted by a base station; and, when the first geographic region is proximate a boundary of a designated home region, redirecting the beam so that the beam covers a second geographic region within the designated home region; and transmitting, via the satellite, control information to a user equipment device that indicates that the beam is redirected.

Example 10 includes the subject matter of example 9, including or omitting optional elements, wherein the control information includes Layer 1 downlink control information.

Example 11 includes the subject matter of example 9, including or omitting optional elements, including determining that the beam cannot be redirected to cover a geographic region within the designated home region; and, in response, shutting off the beam; transmitting, via the satellite, control information indicating that the beam has been shut off to the user equipment device; and transmitting an indication that the beam is shut off to a core network.

Example 12 includes the subject matter of example 11, including or omitting optional elements, wherein the control information includes Layer 1 downlink control information.

Example 13 is a user equipment device, including a processor configured to perform operations including receiving, via a satellite, first system information transmitted by a base station, wherein the first system information identifies a cell ID provided by a beam; in response, measuring a signal strength of a signal transmitted by the cell associated with the cell ID; performing cell selection based on the measured signal strength; receiving, via the satellite, second system information transmitted by the base station, wherein the second system information indicates that the cell associated with the cell ID is shutting down; and in response, performing cell re-selection based on the second system information.

Example 14 includes the subject matter of example 13, including or omitting optional elements, wherein the first system information and the second system information includes system information block 1 (SIB1).

Example 15 includes the subject matter of example 14, including or omitting optional elements, wherein the second SIB1 includes an indication that the cell ID is barred.

Example 16 is a method, including receiving, via a satellite, first system information transmitted by a base station, wherein the first system information identifies a cell ID provided by a beam; in response, measuring a signal strength of a signal transmitted by the cell associated with the cell ID; performing cell selection based on the measured signal strength; receiving, via the satellite, second system information transmitted by the base station, wherein the second system information indicates that the cell associated with the cell ID is shutting down; and in response, performing cell re-selection based on the second system information.

Example 17 includes the subject matter of example 16, including or omitting optional elements, wherein the first system information and the second system information includes system information block 1 (SIB1).

Example 18 includes the subject matter of example 17, including or omitting optional elements, wherein the second SIB1 includes an indication that the cell ID is barred.

Example 19 is a base station, including a processor configured to perform operations including identifying a first geographic region covered by a beam transmitted by a satellite, wherein the beam carries data transmitted by the base station; and when the first geographic region is proximate a boundary of a designated home region, redirecting the beam so that the beam covers a second geographic region within the home region.

Example 20 includes the subject matter of example 19, including or omitting optional elements, wherein the processor is configured to perform operations including determining not to redirect the beam to cover a geographic region within the designated home region; and, in response, during a wait time, transmitting, via the satellite, system information to a user equipment device, wherein the system information indicates that a cell associated with a cell ID is shutting down; transmitting an indication that the cell ID is shut off to a core network; and upon expiration of the wait time, shutting off the beam.

Example 21 includes the subject matter of example 20, including or omitting optional elements, wherein the system information includes system information block 1 (SIB1).

Example 22 includes the subject matter of example 21, including or omitting optional elements, wherein the SIB1 includes an indication that the cell ID is barred.

Example 23 is a method, including identifying a first geographic region covered by a beam transmitted by a satellite, wherein the beam carries data transmitted by a base station; and when the first geographic region is proximate a boundary of a designated home region, redirecting the beam so that the beam covers a second geographic region within the home region.

Example 24 includes the subject matter of example 23, including or omitting optional elements, including determining not to redirect the beam to cover a geographic region within the designated home region; and, in response, during a wait time, transmitting, via the satellite, system information to a user equipment device, wherein the system information indicates that a cell associated with a cell ID is shutting down; transmitting an indication that the cell ID is shut off to a core network; and upon expiration of the wait time, shutting off the beam.

Example 25 includes the subject matter of example 24, including or omitting optional elements, wherein the system information includes system information block 1 (SIB1).

Example 26 includes the subject matter of example 25, including or omitting optional elements, wherein the SIB1 includes an indication that the cell ID is barred.

Example 27 is a user equipment device, including a processor configured to perform operations including determining a geographic location of the user equipment device; determining a public land managed network (PLMN) associated with the geographic location; identifying, based on system information received via a satellite, a cell ID of a cell that supports the determined PLMN; and performing cell selection based on the received system information.

Example 28 includes the subject matter of example 27, including or omitting optional elements, wherein the processor is configured to access storage media of the user equipment device to determine the PLMN associated with the determined geographic location.

Example 29 includes the subject matter of example 27, including or omitting optional elements, including storage media that stores international boundary location and PLMNs associated with a plurality of geographic locations.

Example 30 includes the subject matter of example 27, including or omitting optional elements, wherein the system information includes system information block 1 (SIB1).

Example 31 includes the subject matter of example 30, including or omitting optional elements, wherein the SIB1 includes an information element that indicates one or more PLMNs that are supported by the cell associated with the cell ID.

Example 32 is a method, including determining a geographic location of a user equipment device; determining a public land managed network (PLMN) associated with the geographic location; identifying, based on system information received via a satellite, a cell ID of a cell that supports the determined PLMN; and performing cell selection based on the received system information.

Example 33 includes the subject matter of example 32, including or omitting optional elements, including accessing storage media of the user equipment device to determine the PLMN associated with the determined geographic location.

Example 34 includes the subject matter of example 32, including or omitting optional elements, including accessing storage media of the user equipment device that stores international boundary location and PLMNs associated with a plurality of geographic locations.

Example 35 includes the subject matter of example 32, including or omitting optional elements, wherein the system information includes system information block 1 (SIB1).

Example 36 includes the subject matter of example 35, including or omitting optional elements, wherein the SIB1 includes an information element that indicates one or more PLMNs that are supported by the cell associated with the cell ID.

Example 37 is a base station, including a processor configured to perform operations including identifying a first geographic region covered by a beam carrying data transmitted by the base station; identifying a first PLMN associated with the first geographic region; transmitting, via a satellite, system information to a user equipment device, wherein the system information indicates that a cell ID for a cell associated with the beam supports the first PLMN; and when the first geographic region is proximate a boundary of a designated home region, redirecting the beam so that the beam covers a second geographic region within the home region.

Example 38 includes the subject matter of example 37, including or omitting optional elements, including a processor configured to perform operations including when the beam cannot be redirected to cover a geographic region within the designated home region and associated with the first PLMN, determining a second PLMN associated with a present geographic region covered by the beam; updating the system information to indicate that the cell ID is not associated with the first PLMN and that the cell ID is associated with the second PLMN; communicating an indication of a new mapping of the cell ID to the second PLMN to a core network; and transmitting, via the satellite, the updated system information to the user equipment device.

Example 39 includes the subject matter of example 37 or 38, including or omitting optional elements, wherein the system information includes system information block 1 (SIB1).

Example 40 includes the subject matter of example 39, including or omitting optional elements, wherein the SIB1 includes an information element that indicates one or more PLMNs that are supported by the cell associated with the cell ID.

Example 41 is a method, including identifying a first geographic region covered by a beam carrying data transmitted by a base station; identifying a first PLMN associated with the first geographic region; transmitting, via a satellite, system information to a user equipment device, wherein the system information indicates that a cell ID for a cell associated with the beam supports the first PLMN; and when the first geographic region is proximate a boundary of a designated home region, redirecting the beam so that the beam covers a second geographic region within the home region.

Example 42 includes the subject matter of example 41, including or omitting optional elements, including a processor configured to perform operations including when the beam cannot be redirected to cover a geographic region within the designated home region and associated with the first PLMN, determining a second PLMN associated with a present geographic region covered by the beam; updating the system information to indicate that the cell ID is not associated with the first PLMN and that the cell ID is associated with the second PLMN; communicating an indication of a new mapping of the cell ID to the second PLMN to a core network; and transmitting, via the satellite, the updated system information to the user equipment device.

Example 43 includes the subject matter of example 41 or 42, including or omitting optional elements, wherein the system information includes system information block 1 (SIB1).

Example 44 includes the subject matter of example 43, including or omitting optional elements, wherein the SIB1 includes an information element that indicates one or more PLMNs that are supported by the cell associated with the cell ID.

Example 45 is a user equipment device including a processor configured to perform operations including determining a geographic location of the user equipment device; determining whether the determined geographic location falls within a home region; and performing cell selection based on the determination as to whether the determined geographic location falls within the home region.

Example 46 includes the subject matter of example 45, including or omitting optional elements, wherein the processor is configured to perform operations including accessing storage media storing a set of boundaries for a home region to determine whether the determined geographic region falls within the home region.

Example 47 includes the subject matter of example 45, including or omitting optional elements, wherein the processor is configured to perform operations including receiving, via a satellite, a broadcast message from a base station that communicates a set of boundaries for the home region.

Example 48 includes the subject matter of example 47, including or omitting optional elements, wherein the broadcast message is received in SIB14.

Example 49 includes the subject matter of example 46 or 47, including or omitting optional elements, wherein the set of boundaries includes a polygon location.

Example 50 is a method, including determining a geographic location of a user equipment device; determining whether the determined geographic location falls within a home region; and performing cell selection based on the determination as to whether the determined geographic location falls within the home region.

Example 51 includes the subject matter of example 50, including or omitting optional elements, including accessing storage media storing a set of boundaries for a home region to determine whether the determined geographic region falls within the home region.

Example 52 includes the subject matter of example 50, including or omitting optional elements, including receiving, via a satellite, a broadcast message from a base station that communicates a set of boundaries for the home region.

Example 53 includes the subject matter of example 52, including or omitting optional elements, wherein the broadcast message is received in SIB14.

Example 54 includes the subject matter of example 51 or 52, including or omitting optional elements, wherein the set of boundaries includes a polygon location.

Example 55 is a baseband processor for a user equipment device, configured to perform operations including receiving, via a satellite, control information transmitted by a base station indicating that a beam associated with a cell ID has been redirected; in response, measuring a beam strength of the redirected beam; and performing cell re-selection based on the measured beam strength.

Example 56 includes the subject matter of example 55, including or omitting optional elements, wherein the control information includes Layer 1 downlink control information.

Example 57 is a baseband processor for a user equipment device, configured to perform operations including receiving, via a satellite, first system information transmitted by a base station, wherein the first system information identifies a cell ID provided by a beam; in response, measuring a signal strength of a signal transmitted by the cell associated with the cell ID; performing cell selection based on the measured signal strength; receiving, via the satellite, second system information transmitted by the base station, wherein the second system information indicates that the cell associated with the cell ID is shutting down; and in response, performing cell re-selection based on the second system information.

Example 58 includes the subject matter of example 57, including or omitting optional elements, wherein the first system information and the second system information includes system information block 1 (SIB1).

Example 59 includes the subject matter of example 58, including or omitting optional elements, wherein the second SIB1 includes an indication that the cell ID is barred.

Example 60 is a baseband processor for a user equipment device, configured to perform operations including determining a geographic location of the user equipment device; determining a public land managed network (PLMN) associated with the geographic location; identifying, based on system information received via a satellite, a cell ID of a cell that supports the determined PLMN; and performing cell selection based on the received system information.

Example 61 includes the subject matter of example 60, including or omitting optional elements, wherein the baseband processor is configured to access storage media of the user equipment device to determine the PLMN associated with the determined geographic location.

Example 62 includes the subject matter of example 60, including or omitting optional elements, including storage media that stores international boundary location and PLMNs associated with a plurality of geographic locations.

Example 63 includes the subject matter of example 60, including or omitting optional elements, wherein the system information includes system information block 1 (SIB1).

Example 64 includes the subject matter of example 63, including or omitting optional elements, wherein the SIB1 includes an information element that indicates one or more PLMNs that are supported by the cell associated with the cell ID.

Example 65 is a baseband processor for a user equipment device configured to perform operations including determining a geographic location of the user equipment device; determining whether the determined geographic location falls within a home region; and performing cell selection based on the determination as to whether the determined geographic location falls within the home region.

Example 66 includes the subject matter of example 65, including or omitting optional elements, wherein the baseband processor is configured to perform operations including accessing storage media storing a set of boundaries for a home region to determine whether the determined geographic region falls within the home region.

Example 67 includes the subject matter of example 65, including or omitting optional elements, wherein the baseband processor is configured to perform operations including receiving, via a satellite, a broadcast message from a base station that communicates a set of boundaries for the home region.

Example 68 includes the subject matter of example 67, including or omitting optional elements, wherein the broadcast message is received in SIB14.

Example 69 includes the subject matter of example 66 or 67, including or omitting optional elements, wherein the set of boundaries includes a polygon location.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A processor for a user equipment, the processor configured to perform operations comprising:
   determining a geographic location of the user equipment;
   determining a public land managed network (PLMN) associated with the geographic location;
   identifying, based on system information received via a satellite, a cell ID of a cell that supports the determined PLMN; and
   performing cell selection based on the received system information.

2. The processor of claim 1, further configured to access storage media of the user equipment to determine the PLMN associated with the determined geographic location.

3. The processor of claim 1, further configured to access storage media that stores international boundary location and PLMNs associated with a plurality of geographic locations.

4. The processor of claim 1, wherein the system information comprises system information block 1 (SIB1).

5. The processor of claim 4, wherein the SIB1 includes an information element that indicates one or more PLMNs that are supported by the cell associated with the cell ID.

6. A processor for a user equipment, the processor configured to perform operations comprising: determining a geographic location of the user equipment; determining whether the determined geographic location falls within a home region; and performing cell selection based on the determination as to whether the determined geographic location falls within the home region, wherein the processor, further configured to perform operations comprising: receiving, via a satellite, a broadcast message from a base station that communicates a set of boundaries for the home region, wherein the set of boundaries comprises a polygon location.

7. The processor of claim 6, further configured to perform operations comprising:
   accessing storage media storing a set of boundaries for the home region to determine whether the determined geographic region falls within the home region.

8. The processor of claim 6, further configured to perform operations comprising:
   receiving, via a satellite, a broadcast message from a base station that communicates a set of boundaries for the home region.

9. The processor of claim 8, wherein the broadcast message is received in SIB14.

10. A base station, comprising a processor configured to perform operations comprising:
    identifying a first geographic region covered by a beam carrying data transmitted by the base station;
    identifying a first PLMN associated with the first geographic region;
    transmitting, via a satellite, system information to a user equipment device, wherein the system information indicates that a cell ID for a cell associated with the beam supports the first PLMN; and
    when the first geographic region is proximate a boundary of a designated home region, redirecting the beam so that the beam covers a second geographic region within the home region.

11. The base station of claim 10, comprising a processor configured to perform operations comprising:
    when the beam cannot be redirected to cover a geographic region within the designated home region and associated with the first PLMN,
        determining a second PLMN associated with a present geographic region covered by the beam;
        updating the system information to indicate that the cell ID is not associated with the first PLMN and that the cell ID is associated with the second PLMN;
        communicating an indication of a new mapping of the cell ID to the second PLMN to a core network; and transmitting, via the satellite, the updated system information to the user equipment device.

12. The base station of claim 10, wherein the system information comprises system information block 1 (SIB1).

13. The base station of claim 12, wherein the SIB1 includes an information element that indicates one or more PLMNs that are supported by the cell associated with the cell ID.

* * * * *